United States Patent Office 2,762,407
Patented Sept. 11, 1956

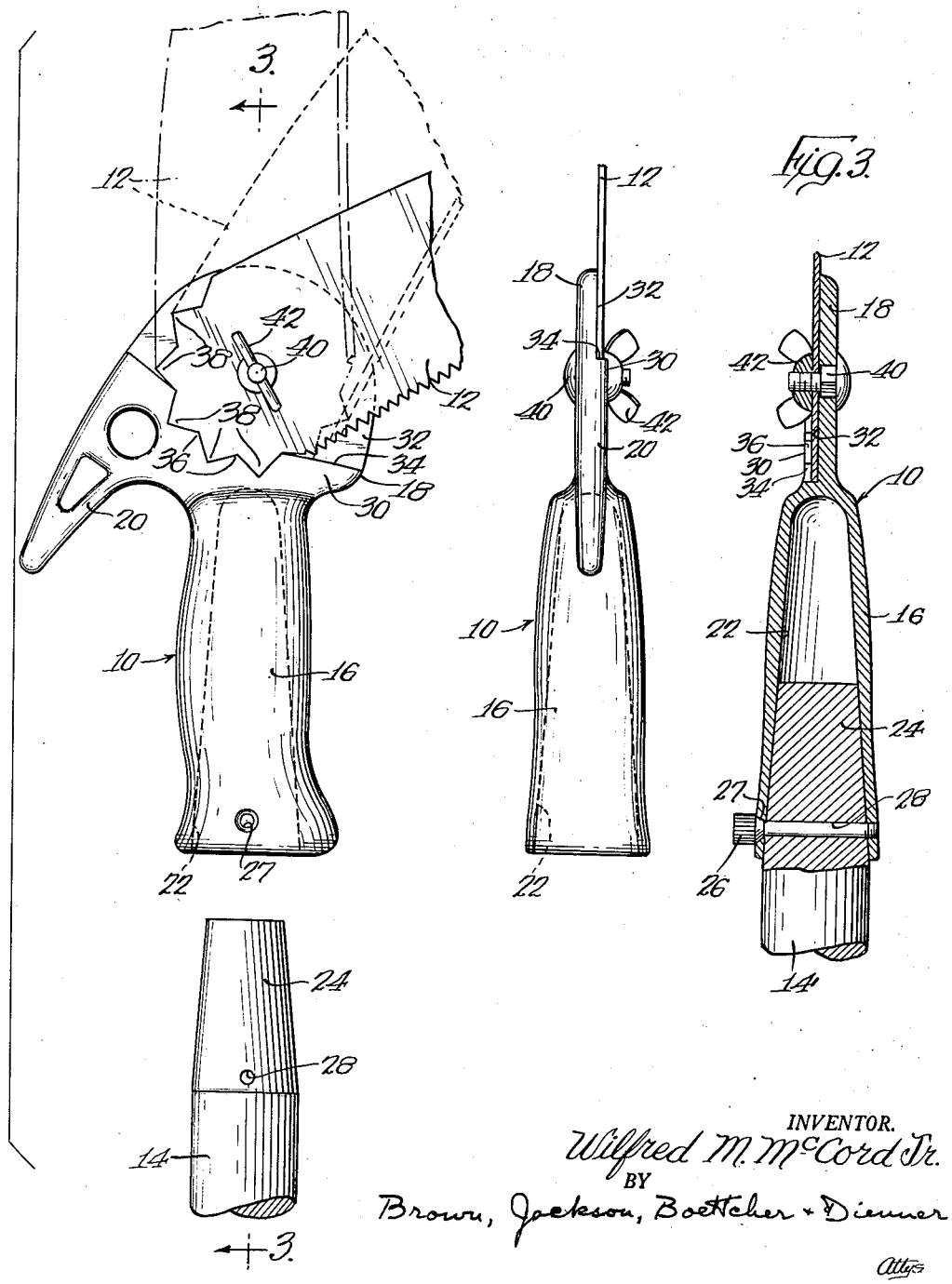

2,762,407

SAW WITH ADJUSTABLE SAW BLADE

Wilfred M. McCord, Jr., Louisville, Ky., assignor to American Saw & Tool Company, Louisville, Ky., a corporation of Kentucky Application December 24, 1954, Serial No. 477,516

1 Claim. (Cl. 145—31)

The present invention relates to saws, and particularly, to an improved saw having a handle, and a blade adjustably mounted on the handle.

Adjustable saws and the purpose thereof are known in the art, and it is an object of the present invention to provide an improved saw of this general character.

Specifically, it is an object of the invention to provide an improved saw including improved cooperable adjusting means on the handle and the blade thereof accommodating rapid adjustment of the blade on the handle to any one of a plurality of positions, in each of which positions the blade is securely mounted on the handle.

Another object of the invention is the provision of an improved adjustable saw of highly economical construction.

A further object of the invention is the provision of an improved adjustable saw wherein the cooperable adjusting means on the blade and handle are formed directly on the blade and handle as part of the normal process of making blades and handles and without necessitating special manufacturing and assembly steps.

A still further object of the invention is to provide an improved adjustable saw wherein the cooperable adjusting means on the handle and the blade are formed along abutting edge portions of the handle and blade.

According to the invention, my improved adjustable saw includes a handle comprising a metallic casting, which is cast to define directly a blade mounting surface, a shoulder defining one edge of the blade mounting surface and locking portions in said shoulder, and a blade comprising a metal stamping having locking portions stamped in one edge thereof which are complemental to and cooperable with the locking portions on the handle. Since the said locking portions are formed, respectively, solely by casting and stamping in the usual or customary manufacturing steps of casting and stamping, the same are obtained, in effect, free of cost, thus to afford a highly economical saw. Further, the disposition of the locking portions in abutting edge portions of the handle and blade affords a structure wherein the locking portions are not subjected to bending stresses and are adapted to support loads applied thereto in an optimum manner.

These and other objects and advantages of the present invention will become apparent in the following detailed description of a preferred embodiment of the invention.

Now, in order to acquaint those skilled in the art with the manner of making and using the improved saw of my invention, I shall describe, in connection with the accompanying drawings, a preferred embodiment of the saw and a preferred manner of making the same.

In the drawings:

Figure 1 is a side elevation of the improved adjustable saw of the invention embodied in a combination hand and pole pruning saw, the view showing the saw blade and pole fragmentarily and the pole detached from the handle, and also showing the blade in solid lines in one position of use and in dotted lines in its other positions of use;

Figure 2 is a rear elevation of the saw blade and handle shown in Figure 1; and

Figure 3 is a transverse vertical section of the pruning saw, the view being taken substantially on line 3—3 of Figure 1 and showing the pole attached to the handle.

Referring now to the drawings, the preferred embodiment of the invention there shown comprises a handle 10, a saw blade 12 adjustably mounted on the handle, and a pole 14 attachable to and detachable from the handle. While the saw of the invention is shown and described herein as embodied in a combination hand and pole pruning saw, it is to be appreciated that the invention is not limited in application to saws of this type.

The handle 10 preferably comprises an integral metallic casting defining a hand grip 16, a blade supporting portion 18 at the upper end of the hand grip, and a hook or pry bar portion 20 extending rearwardly from the portion 18. For the pruning of trees, the hook 20 of the handle facilitates the shearing off of twigs, small dead branches and the like, and also facilitates the removal of cut branches and limbs that fall and rest upon standing portions of the tree. The hand grip 16 is hollow, preferably having a tapered bore 22 therein, to receive the complementally tapered upper end 24 of the pole 14, to accommodate extension of the saw vertically upward into a tree for pruning purposes. Normally, a single pole is all that is required, but if desired a number of poles of different lengths or an extensible pole could be provided. Irrespective of the form of pole, the pole is adapted to be quickly and conveniently attached to the hand grip 16 of the handle 10 merely by inserting the tapered end 24 of the pole into the bore 22. The complementary tapers of the pole and the bore insure intimate reception of the pole in the bore to mount the handle securely on the pole. To fix the pole to the handle against inadvertent displacement, a pin 26 or the like may be passed through aligned diametrical bores 27 and 28 provided in the hand grip and pole, respectively, as is shown in Figure 3. As thus connected, the pole 14 is intimately united to the handle 10 to facilitate manipulation of the blade 12 through the medium of the pole. To detach the pole from the handle, it is only necessary to remove the pin 26 and extract the pole from the hand grip, whereupon the blade 12 and handle 10 are usable as a hand saw.

The blade supporting portion 18 of the handle 10 is generally plate-like and one side wall thereof is stepped to define a pair of parallel offset surfaces, namely, an outer surface 30 which merges with the hook 20 and an inner, forwardly disposed surface 32, the juncture of the two surfaces defining a transverse shoulder 34 therebetween. The portion 18 of the handle 10 is provided with a transverse aperture therethrough generally centrally of the surface 32, and the margins of the surface 32, including the shoulder 34, comprise, generally, a circle struck from the said aperture. The face of the shoulder 34 is stepped, indented, or serrated to a marked extent to define at and in the shoulder a plurality of teeth or projections 36 which are formed on an arc of a circle struck from the said aperture. To either side of the indented portion thereof, the shoulder extends away at a relatively sharp angle from the said arc for a purpose to be explained.

The blade 12 comprises a relatively thin, substantially flat piece of metal, suitably a sheet metal stamping at least in the blanking stage, the main portion of which may be of any form conventional for pruning saws. The blade 12 is of a thickness substantially equal to and preferably slightly less than the height of the shoulder 34 and is adapted to be mounted at the inner or base end thereof on the inner surface 32 of the stepped side wall of the portion 18 of the handle 10. The base portion of the blade is provided with an aperture therein and the base, or rearward, or inner edge of the blade comprises, generally, a semi-circular arc struck from said aperture of a diameter equal to the arc on which the teeth or projections 36 on the handle portion 18 are formed. Herein, the edge of the blade that extends generally transversely of the cutting edge at the inner end of the blade is referred to as the base edge, and this edge of the blade is stepped, indented, or serrated to define along the said arc a plurality of teeth or projections 38 complementary to the teeth or projections 36 on the handle portion 18.

To mount the blade 12 on the portion 18 of the handle 10, a bolt 40 is extended through the aperture in the portion 18 of the handle, the shank of the bolt and said aperture preferably being of complementary, non-circular configuration to retain the bolt against rotation with respect to the handle. The bolt includes a cylindrical threaded portion which projects transversely outward from or normal to the surface 32 of the portion 18, and preferably outwardly beyond the surface 30 as well, to define a pivot axis for the blade 12. The blade 12 is rotatably mounted on the outer end of the bolt 40 by passing the bolt through the aperture in the blade, and the blade is adapted to be pivoted about the bolt to dispose some of the teeth or projections 38 thereof in alternate relation to the teeth or projections 36 defined by the shoulder 34 on the handle portion 18. Since the teeth or projections 36 and 38 are complementary, the blade may then be moved inwardly on the bolt 40 to dispose the side surface of the blade in engagement with the inner side wall surface 32 of the handle and to interfit or interlock the complementary projections 36 and 38. A wing nut 42 may then be threaded onto the stem of the bolt 40 firmly to mount the blade on the handle portion 18. As thus assembled, the interfitted projections 36 and 38 of the handle and blade retain the blade against rotary movement about the bolt 40, the bolt 40 retains the blade against movement in the plane of the surface 32, the surface 32 and nut 42 retain the blade against transverse movement, and the surface 32 affords a rigid support for the blade. Accordingly, the blade is fixed against movement on the handle when the nut 42 is tightened down.

To accommodate angular adjustment of the blade on the handle, the projections 36 formed by the shoulder 34 on the handle portion 18 are fewer in number and extend along a shorter arc than the teeth or projections 38 formed in the base edge of the blade 12. For example, in the embodiment shown, two full teeth and three tooth recesses are defined by the shoulder 34, and five full teeth and six tooth recesses are formed in the base edge of the blade, whereby the blade may assume any one of three positions with respect to the handle, as is shown in solid and dotted lines in Figure 1. By varying the number of projections on the two members, as many or as few positions of adjustment may be accommodated as may be desired. Also, as will be apparent, the tooth form may be varied as desired, the criteria of the present invention being only that the base edge of the blade 12 and the face of the shoulder 34 be complementally indented, the indentation preferably being to a marked depth to define strong intermating projections in the finished product. Since the teeth or projections extend radially into deeply interfitting engagement, the teeth engage each other along a long continuous line of contact to insure substantial resistance to loading, the saw tooth form shown and other forms of projections affording particularly great strength in shear. Also, the provision of a plurality of projections increases the resistance to loading, so that the projections will not break off in use. Due to the structural relationship of the blade and handle, there can be no bending force exerted on the projections 36 and 38 and loading of the interfitting or intermating projections is limited solely to shear stress, which the projections are well suited to support. Accordingly, the adjusting means of the invention insures firm retention of the blade on the handle. As pointed out hereinbefore, the shoulder 34 to either side of the projections 36 formed thereby extends away at a relatively sharp angle from the arc on which the projections 36 are formed, this being for the purpose of avoiding interference with the projections 38 on the blade to accommodate ready adjustment of the blade.

To adjust the blade, it is only necessary to loosen the wing nut 42 to accommodate separation of the intermating projections 36 and 38, whereupon the blade may be pivoted about the bolt 40 to a new setting as accommodated by the projections 36 and 38. The blade is locked in any one of its positions of adjustment merely by tightening the wing nut. In the preferred embodiment of the invention, three positions of adjustment are afforded due to the number of projections provided. In the first position, as shown in solid lines in Figure 1, the blade 12 extends at an angle of approximately 70 degrees to the axis of the hand grip 16. This relative positioning of the blade and hand grip is ideal for hand sawing to afford an efficient angle of cut, particularly for pruning trees. In the second position of the blade provided according to the preferred embodiment of the invention, the blade is disposed at approximately 40 degrees to the axis of the pole, which position is usually the most desirable for pole manipulation of the pruning saw shown. The third position of the blade, which accommodates sawing solely by substantially longitudinal reciprocation of the pole in the preferred embodiment, comprises disposition of the blade substantially in alignment with or at a very slight angle to the axis of the pole, approximately 10 degrees as shown. Adjustability of the blade 12 to the three positions defined thus affords a highly practical saw capable of effecting an efficient cut in all uses to which the saw may be put. In the preferred embodiment, three positions of the saw blade are accommodated, which positions are approximately 30 degrees apart. This relationship is afforded by the particular number of teeth adopted in the shoulder 34 and in the base edge of the blade, and by dimensioning of the teeth so that 12 teeth would be provided about the circle on which the teeth or projections 38 in the base edge of the saw blade are formed. As will be appreciated, more positions of adjustment and different angular displacements between positions may be obtained by appropriate variation of the intermating projections 36 and 38. However, I find the specific structure hereinbefore described to be particularly efficient.

In addition to affording an improved adjustable saw attaining the high degree of practicality and efficiency above referred to, the present invention embodies the saw in a particularly economical structure. The blade 12 is an economical item and the projections 38 thereon and the aperture therein are obtained without cost to the ultimate purchaser by forming the same simultaneously with blanking the blade. In other words, the blanking operation must be performed in any case, so that the only cost factor involved in simultaneously stamping out the projections and making the aperture resides in a small increase in the original die cost, which increase in cost is very quickly absorbed in the unit price upon mass production of the blades. Since the handle 10 must provide a rigid connection between itself and the blade and the pole, in the preferred embodiment, it is highly desirable to form the handle of sturdy, rigid, long wearing material, preferably metal. To cast the handle in one piece is then highly practical and economical, and in so making the handle, the bore in the hand grip, the offsetting of the surfaces 30 and 32, the formation of the shoulder 34 and the formation of the projections 36 are not only obtained "free," as will be appreciated from the above, but actually result in savings of material. As will be apparent, the handle requires no elaborate machining, tumbling to remove burrs and a simple grinding or polishing of the hand grip being the maximum requirement. Accordingly, the adjustable saw of the present invention is very economically made and assembled.

From the foregoing, it is to be appreciated that the present invention provides a single saw facilitating manipulation thereof in a variety of manners. The saw is highly economical, practical and efficient, and includes improved means, provided free of cost, for adjustably mounting the blade on the handle, the blade in each position of adjustment being rigidly supported by and connected to the handle.

While I have described what I regard to be a preferred embodiment of my invention, it will be appreciated that various changes, rearrangements and modifications may be made therein without departing from the scope of the invention, as defined by the appended claim.

I claim:

A saw comprising a unitary handle, said handle including a hand grip and a blade mounting portion at one end of the hand grip, said blade mounting portion having a stepped side wall defining exposed offset inner and outer side wall surfaces and an upwardly and forwardly facing transverse shoulder therebetween, a bolt extending perpendicular to said inner side wall surface in spaced relation to said shoulder, a unitary saw blade pivotally mounted on said bolt to engage at one side thereof against said inner side wall surface of said blade mounting portion, said blade being relatively thin and said shoulder being substantially thicker than said blade, said blade having a base edge engaging said shoulder, a portion of said shoulder and said base edge of said blade being formed on arcs of a common circle struck from said bolt, the arc of said portion of said shoulder being relatively short and facing upwardly and forwardly and the remainder of said shoulder extending away from said circle, the arc of said base edge of said blade being substantially a semi-circle, said portion of said shoulder and said base edge of said blade having a plurality of complementary projections therein, said blade being pivotal about said bolt to dispose some of the projections in the base edge thereof in complemental relation to the projections in said shoulder in a plurality of relative positions of said blade and said handle, the projections in the base edge of said blade, due to the relative thinness thereof, having limited transverse flexibility, and a nut threaded on said bolt, said nut when loosened accommodating disengagement of said projections and pivotal movement of said blade about said bolt, said nut, upon tightening thereof, forcing the side surface of said blade toward said inner side wall surface of said handle to force the said some of the projections in said base edge of said blade into interlocking relation with all the projections in said shoulder, the projections in the base edge of said blade, upon forcible application of said nut, due to their flexibility, working themselves down into intimate engagement along their edges with the faces of the complementary projections in said portion of said shoulder despite irregularities in the projections rigidly to retain said blade in adjusted position on said handle in all relative positions of said blade and said handle, said bolt, nut and projections constituting the sole means retaining said blade in adjusted position on said handle.

References Cited in the file of this patent

UNITED STATES PATENTS

| | | |
|---|---|---|
| 703,334 | Carey | June 24, 1902 |
| 938,680 | Martin | Nov. 2, 1909 |
| 972,085 | Nacey | Oct. 4, 1910 |
| 982,674 | Hibbler | Jan. 24, 1911 |
| 1,229,788 | Ramsey | June 12, 1917 |